(12) United States Patent
Liu et al.

(10) Patent No.: US 11,292,489 B2
(45) Date of Patent: Apr. 5, 2022

(54) SYSTEMS AND METHODS FOR INFORMATION AGGREGATION AND EVENT MANAGEMENT IN A VEHICLE

(71) Applicant: Toyota Motor Engineering & Manufacturing North America, Inc., Plano, TX (US)

(72) Inventors: Qiang Liu, Charlotte, NC (US); BaekGyu Kim, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 52 days.

(21) Appl. No.: 16/942,091

(22) Filed: Jul. 29, 2020

(65) Prior Publication Data

US 2022/0032938 A1     Feb. 3, 2022

(51) Int. Cl.
| | |
|---|---|
| *B60W 50/14* | (2020.01) |
| *B60W 50/08* | (2020.01) |
| *G06N 20/00* | (2019.01) |
| *B60W 40/09* | (2012.01) |
| *G06K 9/62* | (2022.01) |

(52) U.S. Cl.
CPC ............ *B60W 50/14* (2013.01); *B60W 40/09* (2013.01); *B60W 50/085* (2013.01); *G06K 9/6262* (2013.01); *G06N 20/00* (2019.01); *B60W 2050/146* (2013.01); *B60W 2540/225* (2020.02)

(58) Field of Classification Search
CPC .... B60W 50/14; B60W 40/09; B60W 50/085; B60W 2050/146; B60W 2540/225; G06K 9/6262; G06N 20/00

USPC ......................................................... 340/439
See application file for complete search history.

(56) References Cited

U.S. PATENT DOCUMENTS

| | | | |
|---|---|---|---|
| 7,561,966 B2 * | 7/2009 | Nakamura | G01C 21/365 340/461 |
| 10,129,699 B1 | 11/2018 | Vahidi et al. | |
| 10,535,201 B1 | 1/2020 | Price et al. | |

(Continued)

FOREIGN PATENT DOCUMENTS

WO     2018005834 A1     1/2018

OTHER PUBLICATIONS

Lampropoulos, et al., "Enhancing the functionality of augmented reality using deep learning, semantic web and knowledge graphs: A review," Visual Informatics, vol. 4, Issue 1, Mar. 2020, pp. 32-42.

(Continued)

*Primary Examiner* — Omar Casillashernandez
(74) *Attorney, Agent, or Firm* — Christopher G. Darrow; Darrow Mustafa PC

(57) ABSTRACT

System, methods, and other embodiments described herein relate to improving event management in a vehicle by aggregating information sources. In one embodiment, a method includes selecting unfiltered events, from a stream of events that are classified and filtered, and a display medium according to a decision policy associated with an operator. The method also includes communicating the unfiltered events selected for the display medium. The method also includes adapting the decision policy according to collected tracking information of operator attention associated with the unfiltered events and reward values associated with the tracking information.

20 Claims, 5 Drawing Sheets

(56) References Cited

U.S. PATENT DOCUMENTS

| | | | |
|---|---|---|---|
| 10,599,950 B2 | 3/2020 | Bapat et al. | |
| 2018/0249066 A1* | 8/2018 | Katsumata | G06K 9/00805 |
| 2018/0273050 A1* | 9/2018 | Tertoolen | G08G 1/096861 |
| 2018/0285065 A1* | 10/2018 | Jeong | G06F 1/3265 |
| 2019/0108686 A1 | 4/2019 | Spivack et al. | |
| 2021/0331706 A1* | 10/2021 | Kim | G06K 9/00302 |

OTHER PUBLICATIONS

Abdi et al., "Driver information system: a combination of augmented reality, deep learning and vehicular Ad-hoc networks," Multimedia Tools and Applications, vol. 77, Issue 12, Aug. 3, 2017, pp.

Feit et al., "Toward everyday gaze input: Accuracy and precision of eye tracking and implications for design," In Proceedings of the 2017 Chi conference on human factors in computing systems, May 2017, pp. 1118-1130.

"Specifications for EyeX," Tobii Technology, 2016b, 2016, found at https://help.tobii.com/hc/en-us/articles/212818309-Specifications-for-EyeX.

* cited by examiner

SYSTEMS AND METHODS FOR INFORMATION AGGREGATION AND EVENT MANAGEMENT IN A VEHICLE

TECHNICAL FIELD

The subject matter described herein relates, in general, to system events in a vehicle, and, more particularly, to improving event management in a vehicle by aggregating information sources during automated driving.

BACKGROUND

Operator awareness and vision in a vehicle may be compromised on the road due to fog, rain, trees, buildings, or the like. Compromised vision may affect operator judgment resulting in lane deviation, collision, danger, or the like. Reduced vision is particularly problematic in non-line-of-sight environments. Intelligent transportation systems (ITS) may improve safety by communicating non-line-of-sight information and warnings to an operator. For example, a blind spot information system (BLIS) can warn a vehicle operator about nearby vehicles. In this way, BLIS and ITS safety systems improve safety by warning an operator of potential non-line-of-sight objects and hazards.

Furthermore, a system may aggregate event information from a BLIS, an ITS, sensors, the cloud, or the like to display on a heads-up display (HUD). For example, a HUD may display speed, direction, warnings, or the like on a windshield. As a result, the vehicle keeps the attention of the operator on the road without deviating to other screens or controls. Electronic sensor systems and computer vision techniques for ITS and automated driving systems (ADS) through a HUD may also enhance driving safety and comfort by providing perception information about the environment surrounding a vehicle through local and remote information.

The various vehicle mediums used by different information sources may also harm operator awareness, enjoyment, safety, or the like. For example, an object recognition system could output information associated with a pedestrian, a driving lane, other vehicles, trees, or the like. However, notifying an operator about detected objects may be unnecessary and redundant if the lane detection system recommends that the operator stays straight on the road.

Current vehicle information systems may be inefficient or ineffective at optimizing displays, notifications, warnings, or the like to deliver relevant event information from various ITS sources. In particular, a vehicle information system may have difficulty at identifying the importance, relevance, or the like of information from the increasing amounts of ITS sources. For example, information associated with the lanes far from a current driving lane may be irrelevant on a straight portion of a highway. However, the information regarding distant lanes may be useful when a vehicle changes lanes. Correlating, classifying, or categorizing events is complex for varying information sources and vehicle mediums, and thus current systems fail to effectively provide relevant and critical information to an operator.

SUMMARY

In one embodiment, example systems and methods relate to a manner of improving event management in a vehicle when aggregating information sources during automated driving. Aggregating information from multiple sources for various vehicle mediums may be inefficient at communicating relevant information. There are increasing information sources that frequently vary in intelligent transportation systems (ITS), thereby frustrating the functioning of these systems. In various implementations, current solutions may be ineffective and confusing for aggregating and communicating relevant information to an operator. Therefore, in one approach an improved information aggregator system may include a decision module that uses machine learning and feedback from a tracking module to communicate events to an operator from various ITS sources. In particular, the information aggregator system may generate a stream of events that are classified and filtered according to importance to improve event selection by a machine learning agent. An attention tracker may provide operator behavior feedback to the decision module to adapt decision policies for event management. In one approach, the decision module may decide to present an event to the operator through a particular vehicle medium according to an event history, an event type, a time of day, operator behavior feedback, or the like. In this way, the information aggregator system selects event information and optimal vehicle mediums to improve the effectiveness, the relevance, and the safety of events communicated to an operator, thereby improving operation of vehicle event management.

In one embodiment, an aggregator system for improving event management in a vehicle during automated driving is disclosed. The aggregator system includes one or more processors and a memory communicably coupled to the one or more processors. The memory stores a decision module including instructions that when executed by the one or more processors cause the one or more processors to select unfiltered events, from a stream of events that are classified and filtered, and a display medium according to a decision policy for an operator. The decision module further includes instructions to communicate the unfiltered events selected for the display medium. The decision module further includes instructions to adapt the decision policy according to tracking information of operator attention and reward values. The memory also stores a tracking module including instructions that when executed by the one or more processors cause the one or more processors to collect the tracking information of operator attention associated with the unfiltered events and the reward values associated with the tracking information.

In one embodiment, a non-transitory computer-readable medium for improving event management in a vehicle during automated driving and including instructions that when executed by one or more processors cause the one or more processors to perform one or more functions is disclosed. The instructions include instructions to select unfiltered events, from a stream of events that are classified and filtered, and a display medium according to a decision policy for an operator. The instructions also include instructions to communicate the unfiltered events selected for the display medium. The instructions also include instructions to adapt the decision policy according to collected tracking information of operator attention associated with the unfiltered events and reward values associated with the tracking information.

In one embodiment, a method for improving event management in a vehicle is disclosed. In one embodiment, the method includes selecting unfiltered events, from a stream of events that are classified and filtered, and a display medium according to a decision policy for an operator. The method also includes communicating the unfiltered events selected for the display medium. The method also includes adapting the decision policy according to collected tracking information of operator attention associated with the unfiltered events and reward values associated with the tracking information.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving event management in a vehicle by aggregating information sources are disclosed herein. In one embodiment, an aggregator system in a vehicle may use a decision module to select events and a vehicle medium to communicate the events to an operator. The decision module may select events from a stream of events from intelligent transportation systems (ITS), vehicle sensors, a cloud server, an edge server, or the like sources that have data associated with automated driving. In one approach, the aggregator system may classify and filter undesirable events from the stream of events using event importance levels, an operator profile, or the like. The decision module may make a decision to select unfiltered events according to a vehicle status, an event status, or a reward function. For example, the reward function may analyze reward values stored in an experience database associated with prior delivered events and related vehicle mediums. The selected unfiltered events may be communicated to the respective mediums and tracked to collect feedback data.

Furthermore, tracking information may be generated by a tracking module to quantify metrics and analyze responsiveness by the operator to the communicated events. The decision module may also generate reward values associated with each event according to the tracking information to adapt a machine learning and training model. In one approach, using positive reward values may also improve filtering of a classified stream of events. Thus, the aggregator system may use event-driven machine learning and operator tracking for delivering events from a stream of events thereby improving the effectiveness and responsiveness of event management in a vehicle.

Figure 1:
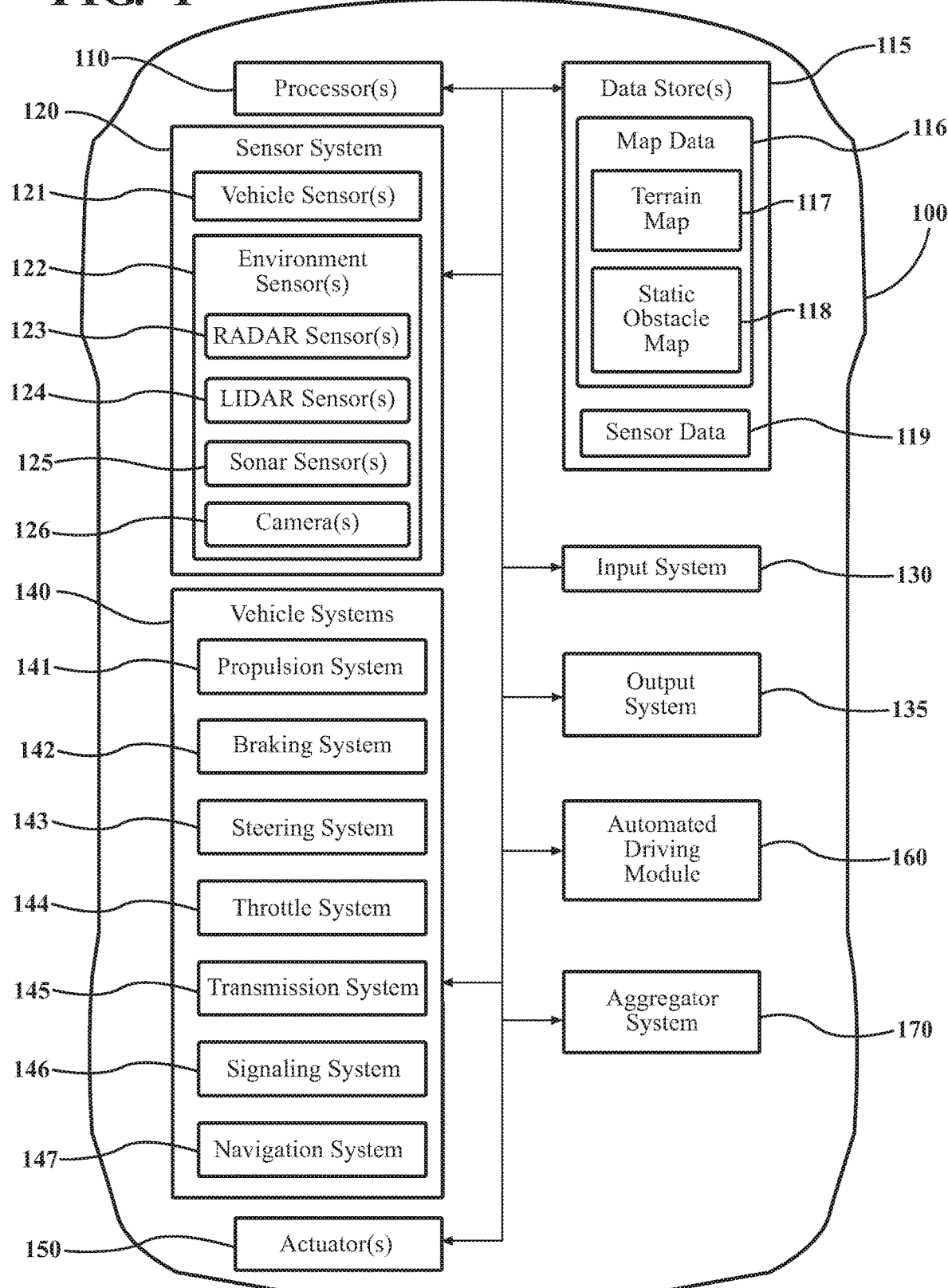
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 may include an aggregator system 170 that is implemented to perform methods and other functions as disclosed herein relating to improving the effectiveness of event management in a vehicle by aggregating various information sources. As will be discussed in greater detail subsequently, the aggregator system 170, in various embodiments, may be implemented partially within the vehicle 100 and as a cloud-based service. For example, in one approach, functionality associated with at least one module of the aggregator system 170 is implemented within the vehicle 100 while further functionality is implemented within a cloud-based computing system.

Figure 2:
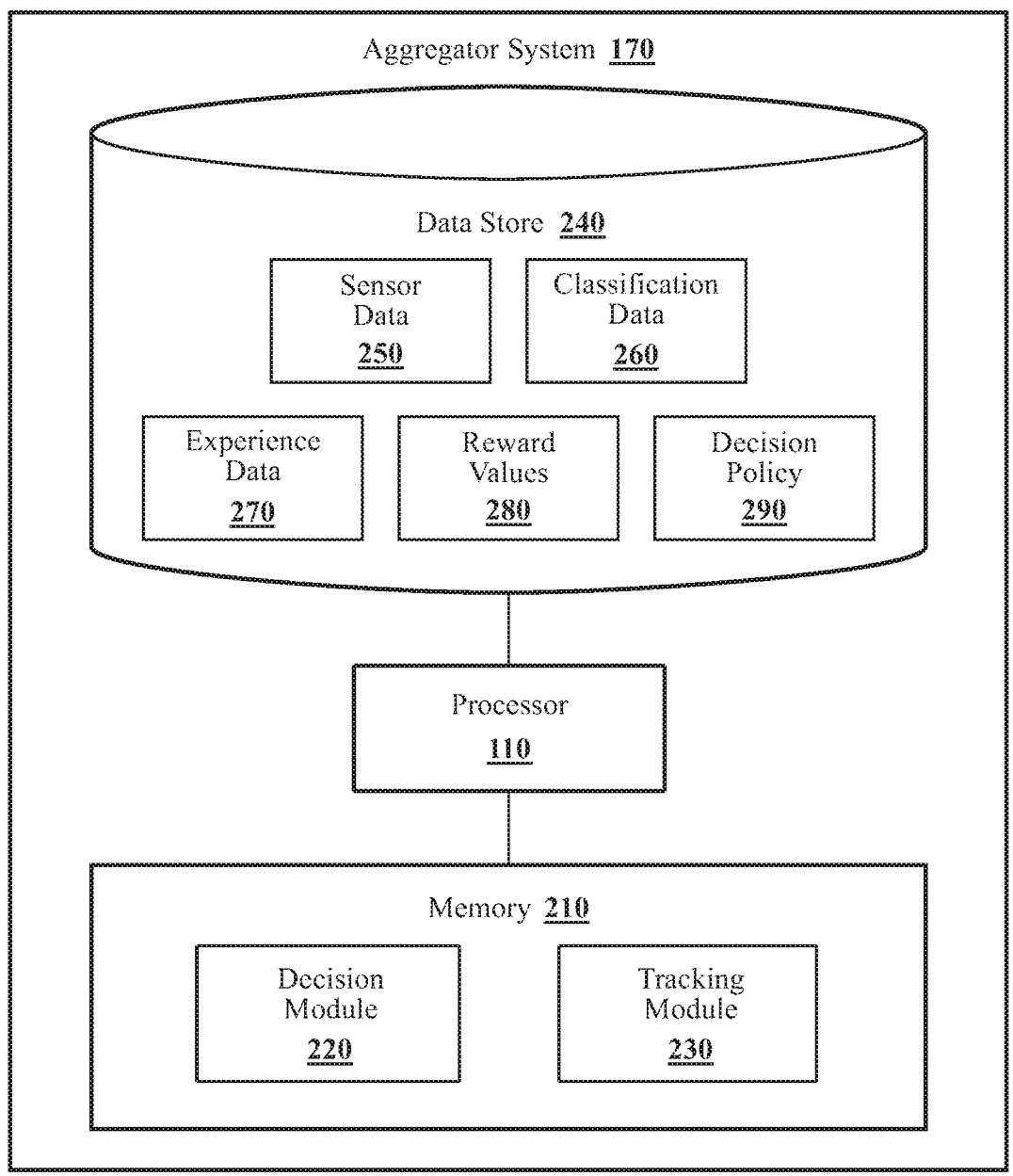
FIG. 2 illustrates one embodiment of an aggregator system that is associated with aggregating and selecting events for various vehicle mediums within the vehicle of FIG. 1.

FIG. 2 illustrates one embodiment of an aggregator system 170 that is associated with aggregating and selecting events for various vehicle mediums within the vehicle 100 of FIG. 1. The aggregator system 170 is shown as including a processor 110 from the vehicle 100 of FIG. 1. Accordingly, the processor 110 may be a part of the aggregator system 170, the aggregator system 170 may include a separate processor from the processor 110 of the vehicle 100, or the aggregator system 170 may access the processor 110 through a data bus or another communication path. In one embodiment, the aggregator system 170 may include a memory 210 that stores a decision module 220 and the tracking module 230. The memory 210 may be a random-access memory (RAM), read-only memory (ROM), a hard-disk drive, a flash memory, or other suitable memory for storing the modules 220 and 230. The modules 220 and 230 may be, for example, computer-readable instructions that when executed by the processor 110 cause the processor 110 to perform the various functions disclosed herein.

The aggregator system 170 as illustrated in FIG. 2 is generally an abstracted form that includes the decision module 220 and the tracking module 230. The decision module 220 may generally include instructions that function to control the processor 110 to receive data inputs from one or more sensors of the vehicle 100. The inputs are, in one embodiment, observations of one or more objects in an environment proximate to the vehicle 100 and/or other aspects about the surroundings.

Furthermore, the tracking module 230, in one embodiment, may control the respective sensors to provide the data inputs in the form of the sensor data 250. Additionally, while the tracking module 230 is discussed as controlling the various sensors to provide the sensor data 250, in one or more embodiments, the tracking module 230 can employ other techniques to acquire the sensor data 250 that are either active or passive. For example, the tracking module 230 may passively sniff the sensor data 250 from a stream of electronic information provided by the various sensors to further components within the vehicle 100. Thus, the sensor data 250, in one embodiment, represents a combination of perceptions acquired from multiple sensors.

In general, the sensor data 250 includes at least the vehicle control inputs. The vehicle control inputs comprise, in one example, steering inputs (e.g., steering wheel angle, rate and direction of rotation, etc.), braking inputs (e.g., the extent of brake pedal activation/pressure), and acceleration inputs (e.g., the extent of accelerator pedal activation/pressure). In further aspects, the vehicle control inputs also specify transmission control inputs (e.g., gear selection), drive mode (e.g., 2-wheel drive, 4-wheel drive, etc.), engine/motor parameters (e.g., engine RPM, driving mode for hybrid vehicles, etc.), and so on. In yet further aspects, the sensor data 250 includes current dynamics data such as angular velocity, g-forces (e.g., longitudinal, lateral, etc.), speed profile, wheel speeds, activation controls (e.g., anti-lock brake system (ABS) activation, traction control activation, stability control activation, etc.), and so on.

As one example, the aggregator system 170 may, in one or more approaches, be configured to adapt to different electronic inputs depending on the availability of such information. As an additional note, telematics data as used herein generally encompasses the sensor data 250 and may include further information such as vehicle identifiers, location information (e.g., global positioning system (GPS) position), and other information that may be used by the aggregator system 170 to generate warnings associated with the location for the vehicle 100.

Moreover, in one embodiment, the aggregator system 170 may include a data store 240. In one embodiment, the data store 240 is a database. The database may be, in one embodiment, an electronic data structure stored in the memory 210 or another data store and that is configured with routines that can be executed by the processor 110 for analyzing stored data, providing stored data, organizing stored data, and so on. Thus, in one embodiment, the data store 240 stores data that may be used by the modules 220 and 230 in executing various functions. In one embodiment, the data store 240 includes the sensor data 250 along with, for example, metadata that characterize various aspects of the sensor data 250.

In one embodiment, the data store 240 may also include the classification data 260, the experience data 270, the reward values 280, and the decision policy 290. The classification data 260 may specify an event importance level associated with an event. A list of non-limiting examples of importance levels 0-4 is given in Table 1.

TABLE 1

| Levels | Description | Example |
| --- | --- | --- |
| 0 (Catastrophic) | Events could result in catastrophic consequences | e.g., Powertrain error, incoming collision, etc. |
| 1 (Severe) | Events could result in severe consequences | e.g., Pedestrian avoidance, proactive braking, accident reminder, etc. |
| 2 (Normal) | Events could result in normal consequences | e.g., Lane close, lane detection, pedestrian detection, etc. |
| 3 (Reminder) | Events provide reminders, no immediate consequence to no response | e.g., Route change, weather reminder, slow down reminder, phone call, etc. |
| 4 (Information) | Events only provide information, no consequence to no response | e.g. Advertisement, entertainment, etc. |

The aggregator system 170 may classify or categorize an event in the stream of events associated with a potential catastrophe with a value of 0. The aggregator system 170 may classify values 1-4 as less urgent events for the operator of vehicle 100. In this way, the aggregator system 170 can analyze, correlate, and filter events according to the content importance level to optimize relevance for an operator.

The decision module 220 may use behavior tracking, attention tracking, reward values, reward history, and other operator information stored in the experience data 270 for a machine learning and training model. For example, the aggregator system 170 may train a model associated with a deep reinforcement learning (DRL) module to improve event selection from a stream of events. As explained further below, the decision module 220 may use the reward values 280 to adapt the decision policy to learn and improve event selection for various vehicle mediums. In one approach, the DRL module may generate the reward values 280 according to a reward function that may utilize a vehicle medium location of an event, a vehicle medium type for the event, a time duration of the event, a gaze time, an event type, or the like. According to these and other parameters, the reward values 280 may represent the effectiveness of presenting the event to an operator in a particular vehicle medium.

The decision module 220, in one embodiment, may include instructions that cause the processor 110 to use a machine learning and training model to select events from a stream of events for the operator. In one approach, the decision module 220 may also determine the optimal vehicle medium within the vehicle 100 to communicate the event. In one approach, the decision module 220 may use attention information from the tracking module 230 as feedback associated with the operator. The decision module 220 may use the feedback to adapt the decision policy 290 associated with communication events for an operator in various vehicle mediums.

Furthermore, the tracking module 230 may use vehicle sensors 121 to gather data associated with the selected events and vehicle mediums. The gathered data may include attention data, eye-tracking data, or eye motion data of an operator associated with event information presented on multiple vehicle mediums, screens, controls, or the like. The aggregator system 170 may store the gathered data in the sensor data 250 and the experience data 270. In one approach, the aggregator system 170 may store the experience data 270 on a cloud server. For example, other vehicles or systems may use the experience data 270 for forming operator event policies according to the gathered data.

The gathered data may be fed back to the decision module 220 from the sensor data 250 or the experience data 270 to analyze or correlate. The decision module 220 may optimize the decision policy 290 for the selection of events according to a positive correlation between the sensor data 250 and the experience data 270. In this way, the decision module 220 may adjust the decision policy 290 to provide relevant event information that is effectively viewed by the operator.

Referring again to the decision module 220, in one approach, the decision module 220 may use a machine learning algorithm embedded within the decision module 220, such as a DRL agent or a convolutional neural network (CNN), to perform semantic segmentation over the sensor data 250 to derive further information. As further explained below, the decision module 220 may adapt the decision policy 290 according to operator or vehicle status thereby improving the delivery of relevant event information to an operator from multiple information sources.

Figure 3:
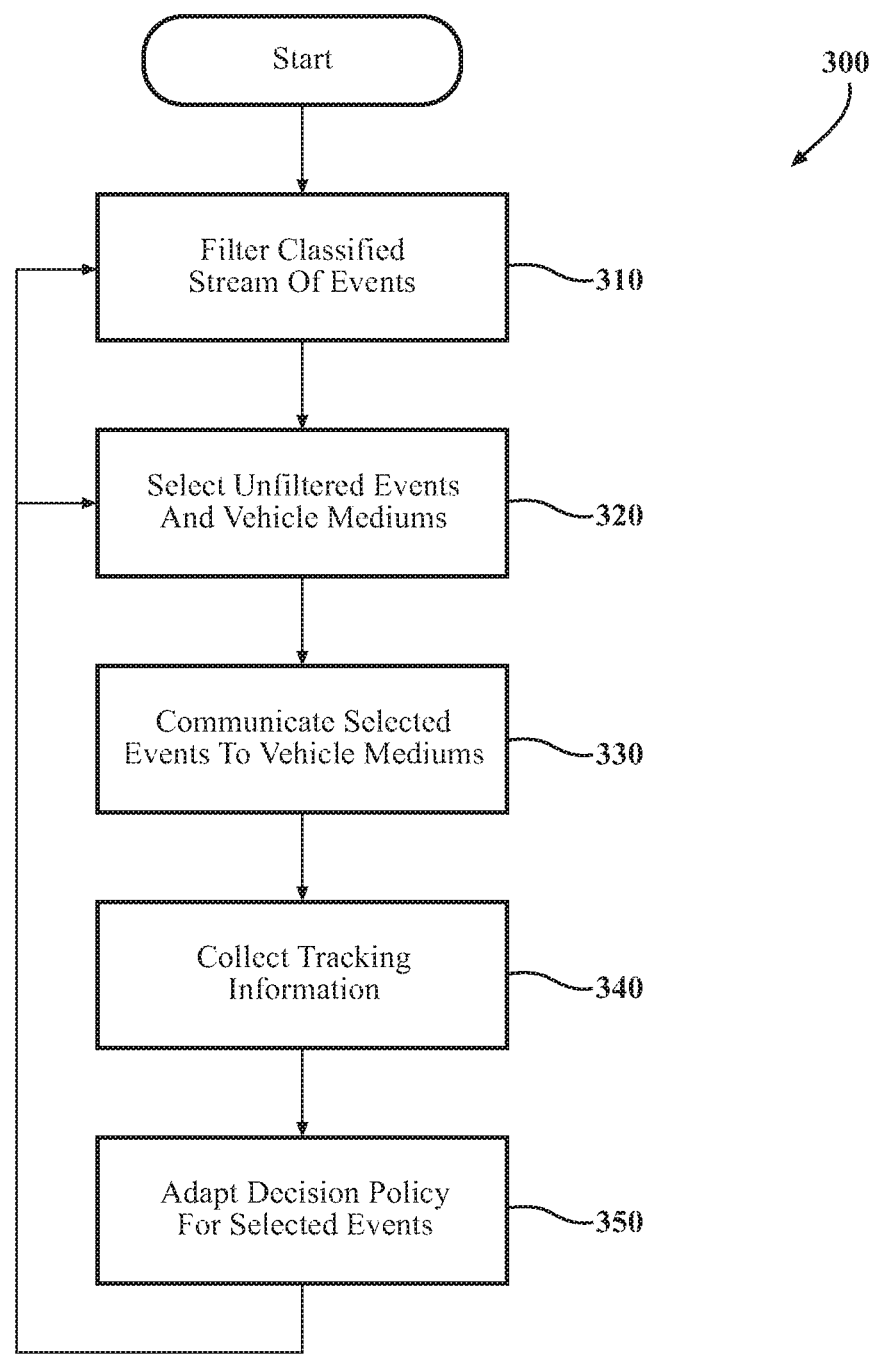
FIG. 3 illustrates one embodiment of a method that is associated with aggregating, selecting, and communicating events within a vehicle.

Additional aspects of information aggregating and selection will be discussed in relation to FIG. 3. FIG. 3 illustrates one embodiment of a method that is associated with aggregating, selecting, and communicating events within a vehicle. The method 300 may be discussed from the perspective of the aggregator system 170 of FIGS. 1 and 2. While the method 300 is discussed in combination with the aggregator system 170, it should be appreciated that the method 300 is not limited to being implemented within the aggregator system 170 but is instead one example of a system that may implement the method 300.

As a brief introduction to the method 300, prior to the discussion of the explicitly identified functions, the aggregator system 170 may classify or categorize and subsequently filter content for a stream of events aggregated from various information sources using event importance levels. In one approach, the aggregated stream of events may be a mainstream of events from main hardware components or information sources of the vehicle 100. In this way, the stream of events may include critical events to deliver to an operator of the vehicle 100.

Examples of event importance levels are given in Table 1. The aggregator system 170 may classify the content of each event in the stream of events according to event importance levels for more effective event filtering and selection. In one approach, the various information sources may include the vehicle sensor(s) 121, a cloud server, an edge server, or the like that generate data during automated driving. For example, event information from a cloud or edge server may improve the driving experience by dynamically optimizing routes with big data to avoid traffic. A remote server may also improve travel routes by facilitating data sharing through vehicle-to-vehicle communication. Thus, the aggregator system 170 may improve the selection of relevant events for an operator by classification using the event importance levels 0-4.

Furthermore, the aggregator system 170 may filter the classified events from the stream of events using the event importance levels and the decision policy 290. The decision module 220 may adapt the decision policy 290 according to tracking data from the tracking module 230. For example, the tracking data may indicate operator attention or awareness to different event types for particular vehicle mediums. The decision module 220 may select unfiltered events and an optimal vehicle medium to present the unfiltered events using a machine learning and training model. In one approach, the decision module 220 may adapt the decision policy 290 using information collected by the tracking module 230 associated with the displayed unfiltered events. Thus, the aggregator may adapt the decision policy 290 for filtering and selecting classified events to improve the delivery of relevant vehicle-related events to an operator from various information sources.

Referring again to aggregating, selecting, and communicating events within a vehicle in FIG. 3, at 310 the aggregator system 170 may filter a classified stream of events. In one approach, the aggregator system 170 may use an information source classifier that integrates events into different importance levels. In one approach, information sources may include a vehicle sensor 121, an electronic control unit (ECU), a cloud server, an edge server, a vehicle-to-vehicle (V2V) system, a vehicle to everything (V2X) system, or the like. For example, the aggregator system 170 may classify the content of each event according to urgency, a vehicle status, an operator status, a vehicle location, an automated driving mode, or the like. The aggregator system 170 may filter the classified stream of events according to a system configuration, a vehicle status, an operator preference, an operator profile, automated driving configurations, or the like. For example, an event that is level 0 according to Table 1 is unfiltered since a catastrophic consequence may occur. In one approach, the aggregator system 170 may filter levels 2-4 according to an operator preference and designate levels 0-1 as unfiltered. Furthermore, the aggregator system 170 may classify and filter sub-categories of an event to improve the precision of event management for the vehicle 100.

The aggregator system 170 may also filter events according to the decision policy 290. As explained further herein, the decision module 220 may adapt the decision policy 290 according to different event types, a vehicle status, an operator status, a location, a vehicle medium location, or the like. Accordingly, the aggregator system 170 may filter events more precisely according to the adaptation or the adjustments of the decision policy 290. Thus, filtering may be improved by providing more relevant events and filtering undesired events using the decision policy 290.

At 320, the decision module 220 may select unfiltered events and vehicle mediums for the unfiltered events. A vehicle medium may be a heads-up display (HUD), an augmented reality (AR) glass, a display, a screen, a vehicle control(s), side-mirror, a sound system, or any other output in the vehicle 100 used to inform the operator. In one approach, the decision module 220 may select a vehicle medium for each unfiltered event using the decision policy 290 to effectively deliver relevant events in a timeslot. For example, a lane deviation warning may be more effective on a front glass with a sound warning instead of only a console prompt.

The aggregator system 170 and the decision module 220 may adapt the decision policy 290 according to scenarios associated with the stream of events. For example, lane detection event notifications may be unnecessary during a clear day. Information related to pedestrians on a sidewalk during the daytime may also be unnecessary. As another example, front vehicle detection event notification may be unnecessary during good visibility and weather.

Concerning adaptation of the decision policy 290, the decision module 220 may use event-driven machine learning and training to select unfiltered events. For example, the decision module 220 may use an advanced DRL or CNN to determine whether an event of the stream events will be displayed and the most effective vehicle medium(s). In one approach, the DRL may include an agent and an environment for the agent to observe states. The agent may make a decision, an action, or decision action as output for unfiltered events. The agent may adapt or train the decision policy 290 according to feedback, a reward feedback, a reward, or the like associated with the decision.

Moreover, the decision module 220 and agent may use a state space to make a decision. Table 2 is an example of a state space including an event status and a vehicle status for various system parameters.

TABLE 2

| Categories | Item | Example |
| --- | --- | --- |
| Event Status | Importance Level | 0, 1, 2, 3, 4 |
| | Operator Preference (filter) | 0, 1, |
| | Event Source | Cloud, ECU, sensor, etc. |
| | Data Size | 1.2 Mbits, 4 Mbits, etc. |
| | Display Duration | 1 second, 10 seconds, etc. |
| Vehicle Status | Geographic Location | [10.32, 23.42] . . . |
| | Vehicle Speed | 20, 30, 50 miles per hour (mph). . . |
| | Timestamp | 12:02, 15:32, etc. |
| | Weather | Fog, rain, etc. |
| | Direction | Southeast, Northwest, etc. |

The event status may include an importance level, event source, data size, display duration, etc. associated with each event in the stream of events. The vehicle status may include vehicle speed, a timestamp, a location, a weather, vehicle direction, etc. associated with each event in the stream of events.

The agent may use the state space and an action space to make a decision to select an unfiltered event. The agent may use the state space to understand the state of the environment or the context of displaying an event in the vehicle 100 for a particular operator. The agent may also use an action space representing possible vehicle mediums in the vehicle 100 to select an optimal vehicle medium for an event.

At 330, the decision module 220 may communicate selected events and a vehicle medium location associated with a decision. In one approach, the agent may set the decision index from 0-3 for a selected event according to a display medium of the vehicle 100. Otherwise, the decision module 220 may output a decision of −1 to indicate that the event will not be communicated to a vehicle medium. In one approach, the decision module 220 may output a multi-dimensional decision that includes a medium value range of −1 to 3 and screen coordinates (X, Y) if needed for a selected event. The medium value range may indicate that an event will be communicated to a HUD, display, sound system, haptic feedback, or the like.

At 340, the tracking module 230 may collect tracking information associated with the selected events. The decision module 220 and agent may determine a reward according to operator attention, awareness, focus, views, or the like information from the collected tracking information. In one approach, the tracking information may include eye-tracking information that identifies an operator's view of an event delivered to a vehicle medium. For example, the eye-tracking information may indicate a 1 if the operator directly viewed the event on the vehicle medium. The 1 may be used by the decision module 220 as the reward value for a machine learning and training model. In certain configurations, a value of X (e.g. 10 centimeters) from a center view of the event may be valued 0.8. If X is beyond a certain threshold (e.g. 1 meter) from a center view, the reward value may be 0. In this way, event management may be improved by the decision module 220 by adapting the decision policy 290 to understand the responsiveness and relevance of an event on a particular vehicle medium to an operator.

At 350, the decision module 220 may adapt the decision policy 290 to use for filtering or selecting events of the stream of events. In one approach, the decision module 220 may use the tracking information from the tracking module 230. For example, the decision module 220 may use a reward function to determine a reward value according to the medium location in the vehicle, event time duration, event type, or the like. In one approach, the decision module 220 may select a different event type or a vehicle medium if the reward value is 0.

Furthermore, the tracking module 230 may track over time the quantified gaze, view, or attention values of an operator associated with various events for a particular vehicle medium. The values associated with an event may be analyzed and correlated to determine effective combinations of events, mediums, event time durations, or the like. For example, the tracking module 230 may calculate values of 1, 0.5, 0, 0.8, 1, and 0 over a time period associated with communicated unfiltered events 1-6, respectively. The decision module 220 may adapt the decision policy 290 by labeling events 1, 4, and 5 as effective by using 1, 0.5, 0, 0.8, 1, and 0 as reward values. The aggregator system 170 may store these values in the experience data 270 for further machine learning and event filtering.

In one approach, the aggregator system 170 and decision module 220 may improve event selection for vehicle 100 by analyzing the data measurements from the tracking module 230. For example, the tracking module 230 may return a reward value of 0.5 for an event type A for display on medium 2 at screen coordinates ($X_1$, $Y_1$) during the automated driving of operator 1. For the same event type A, the tracking module 230 may return a reward value of 0.9 when displayed on medium 3 at screen coordinates ($X_2$, $Y_2$) during the automated driving of operator 1. In this way, the decision module 220 improves the selection of events by adapting the decision policy 290 for operator 1 to recommend event A to display on medium 3 in proximity to coordinates ($X_2$, $Y_2$) during automated driving.

Figure 4:
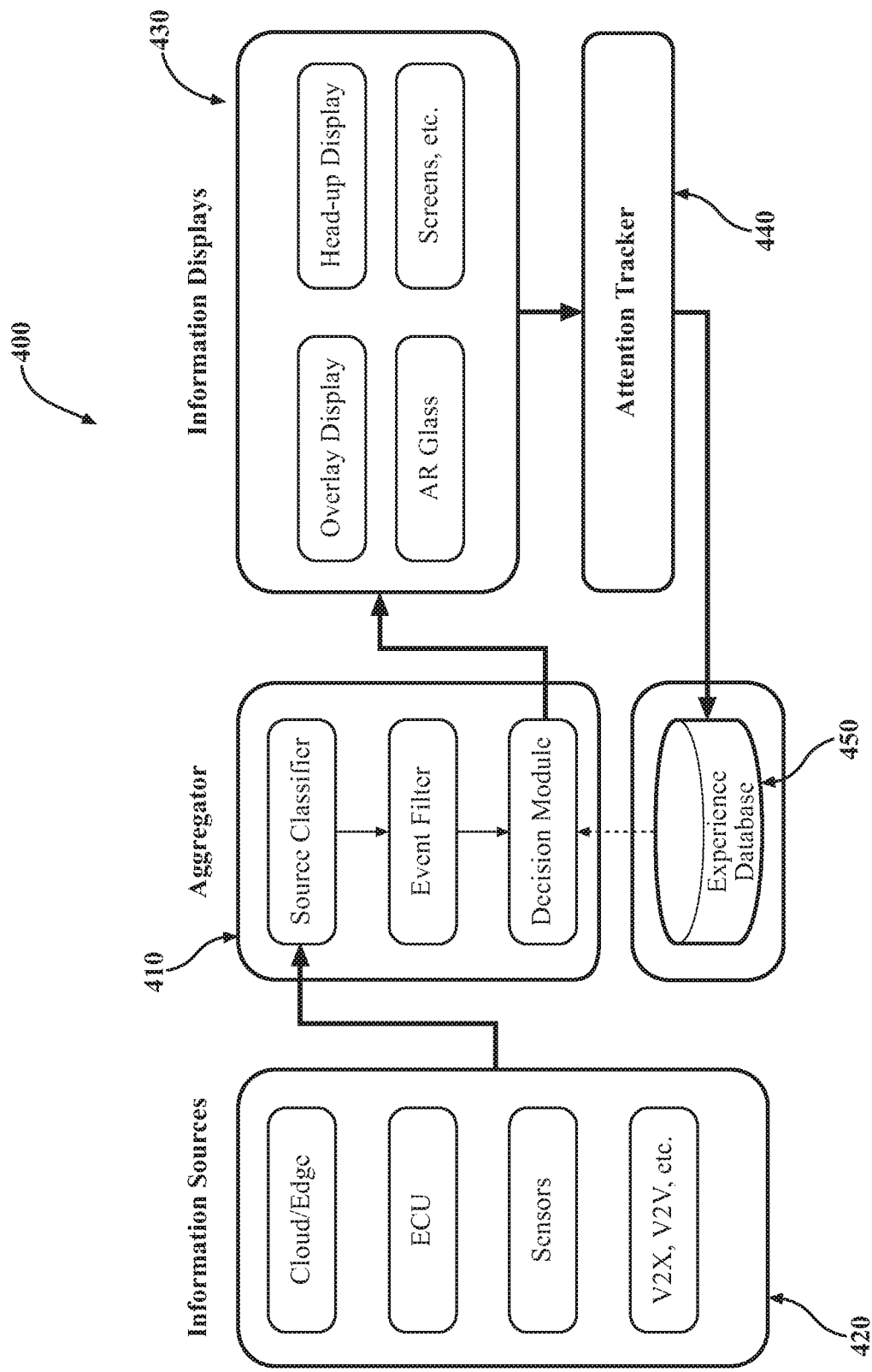
FIG. 4 illustrates an example of an aggregator system that is associated with aggregating and selecting local and remote events of a vehicle to communicate to an operator.

FIG. 4 illustrates an example of an aggregator system that is associated with aggregating and selecting local and remote events of a vehicle to communicate to an operator 400. The aggregator system 410 may receive information from information sources 420. In one approach, the information sources 420 may include event data from the vehicle sensor(s) 121, a cloud server, an edge server, or the like during automated driving. A source classifier module may analyze, correlate, classify, or categorize the data as events according to urgency, a vehicle status, an operator status, a vehicle location, an automated driving mode, or the like.

The aggregator system 410 may use an event filter to filter the classified stream of events according to a system configuration, a vehicle status, an operator preference, an operator profile, automated driving configurations, or the like. For example, the aggregator system 410 may filter as unnecessary an event that is a level 4 according to Table 1 and the current automated driving configuration. In one approach, the aggregator system 410 may use levels 1-3 as unfiltered events according to an operator preference.

In 400, a decision module may select unfiltered events and associated vehicle mediums using a machine learning agent. In one approach, the machine learning agent may output a multi-dimensional decision for a selected event that includes a medium index of −1 to 2 and (X, Y) location for a display medium. The aggregator system 410 may communicate the event for presentation according to the medium index that specifies an overlay display, HUD, sound system, AR glass, screens, or the like of information displays 430.

Furthermore, attention tracker 440 may use eye, gaze, head, attention, view, awareness, or the like tracking of an operator to determine the effectiveness of delivered events. The tracking values associated with delivered events may be analyzed and correlated to determine effective combinations of events, mediums, event time durations, or the like. For example, the attention tracker 440 may output values of 0, 0, 0, 0, 1, 0, 0, 0, 0 over a time period associated with events 1-9, respectively. These outputs may be stored in the experience database 450 to train the decision module 220. The event filter may also use the stored outputs to improve event filtering. As another example, the decision module 220 may adapt the decision policy by labeling all events except one as ineffective or undesirable by using 0, 0, 0, 0, 1, 0, 0, 0, 0 as reward values.

Figure 5:
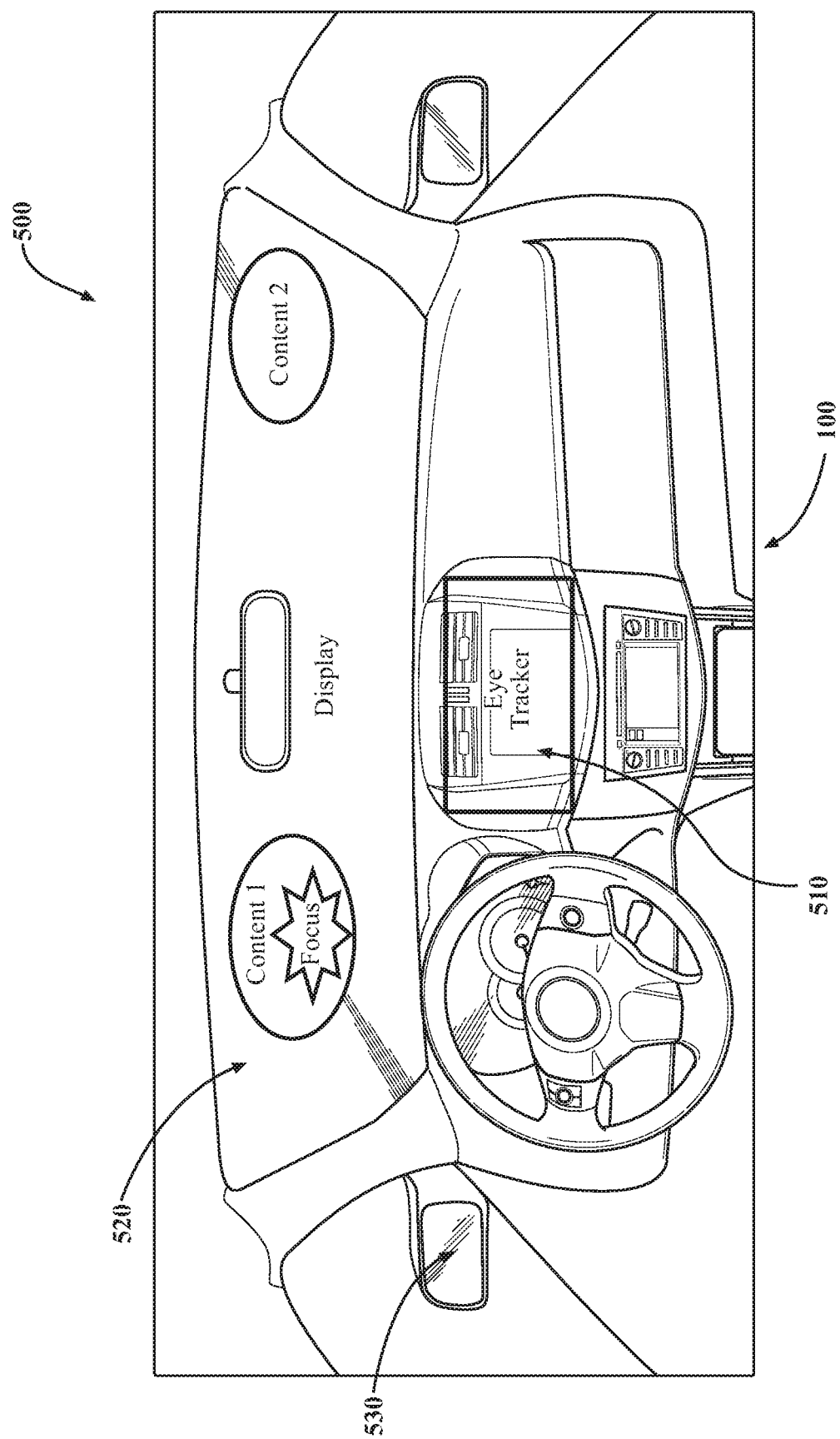
FIG. 5 is a diagram that illustrates a vehicle driving environment that displays selected events from an aggregator system and tracks operator attention of events.

FIG. 5 is a diagram that illustrates a vehicle driving environment 500 that displays selected events from an aggregator system and tracks operator attention of events. In one approach, the eye tracker 510 in the vehicle 100 may operate at 1% accuracy at 60 Hz precision to gather data associated with eye, gaze, or head position of an operator. In this configuration, the eye tracker 510 may detect an offset of 1.1 cm for a target 65 cm away from the operator on the display 520.

In the vehicle driving environment 500, an information aggregator of the vehicle 100 may communicate unfiltered events Content 1 and Content 2 to view on display 520 instead of side-screen 530. A decision module may choose display 520 over side-screen 530 as a vehicle medium according to classified importance levels of Content 1 and Content 2. In this way, the vehicle 100 may display Content 1 and Content 2 in a manner that is more effective for consumption by an operator using classification and machine learning.

In addition, an operator's attention on Content 1 and Content 2 may be tracked by the eye tracker 510. For example, the eye tracker 510 may determine that the focus of the operator is on the Content 1 within 1 cm off a center view. Accordingly, the eye tracker 510 may output a value of 0.8 as a reward feedback for Content 1 and output a value of 0 for Content 2. The values 0.8 and 0 may be fed back to a decision module for a machine learning and training model. A decision module or agent may use the reward value, a system state, a vehicle state, an operator state, a location, a time, weather, or the like associated with Content 1 as a weight to further deliver content similar to Content 1 on similar vehicle mediums. Accordingly, an information aggregator and decision module are trained with reliable feedback to deliver relevant and effective events from a stream of events.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an ECU, and an application-specific integrated circuit (ASIC), a microprocessor, etc. The vehicle 100 can include one or more data stores 115 for storing one or more types of data. The data store 115 can include volatile and/or non-volatile memory. Examples of suitable data stores 115 include RAM, flash memory, ROM, PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more light detection and ranging (LIDAR) sensors 124 of the sensor system 120.

In some instances, at least a portion of the map data 116 and/or the sensor data 119 can be located in one or more data stores 115 located on-board the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that an operator or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect the position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a GPS, a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangements or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The vehicle 100 can include one or more actuators 150. The actuators 150 can be element or combination of elements operable to alter one or more of the vehicle systems 140 or components thereof to receive signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial intelligence elements, e.g., neural network, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with another module can be configured to determine travel path(s), current autonomous driving maneuvers for the vehicle 100, future autonomous driving maneuvers and/or modifications to current autonomous driving maneuvers based on data acquired by the sensor system 120. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer, and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An aggregator system for improving event management in a vehicle during automated driving comprising:
one or more processors;
a memory communicably coupled to the one or more processors and storing:
a decision module including instructions that when executed by the one or more processors cause the one or more processors to:
select unfiltered events, from a stream of events that are classified and filtered, and a display medium according to a decision policy for an operator;
communicate the unfiltered events selected for the display medium;
adapt the decision policy according to tracking information of operator attention and reward values; and
a tracking module including instructions that when executed by the one or more processors cause the one or more processors to:
collect the tracking information of operator attention associated with the unfiltered events and the reward values associated with the tracking information.

2. The aggregator system of claim 1, wherein the decision module includes instructions to select the unfiltered events including instructions to generate a decision output by a deep reinforcement learning (DRL) agent according to an event status, a vehicle status, and the reward values.

3. The aggregator system of claim 1 further comprising an aggregator module including instructions that when executed by the one or more processors cause the one or more processors to filter events of the stream of events according to event importance levels and the decision policy.

4. The aggregator system of claim 1, wherein the decision module includes instructions to adapt the decision policy including instructions to adapt the reward values according to eye-tracking information of the operator associated with the tracking information and a display time of the unfiltered events on the display medium.

5. The aggregator system of claim 4, wherein the instructions to adapt the reward values further include instructions to adjust the reward values according to the eye-tracking information indicating centered views of the unfiltered events on the display medium.

6. The aggregator system of claim 1, wherein the decision module includes instructions to adapt the decision policy including instructions to generate the reward values using a reward function according to one of a location, a medium type, a time duration, or an event type associated with the unfiltered events.

7. The aggregator system of claim 1 further comprising an aggregator module to classify each event of the stream of events according to event importance levels and the decision policy.

8. The aggregator system of claim 1 further comprising an aggregator module to generate the stream of events for a current timeslot from a plurality of information sources associated with the vehicle and the operator.

9. A non-transitory computer-readable medium for improving event management in a vehicle during automated driving and including instructions that when executed by one or more processors cause the one or more processors to:
select unfiltered events, from a stream of events that are classified and filtered, and a display medium according to a decision policy for an operator;
communicate the unfiltered events selected for the display medium; and
adapt the decision policy according to collected tracking information of operator attention associated with the unfiltered events and reward values associated with the tracking information.

10. The non-transitory computer-readable medium of claim 9, wherein the instructions to select the unfiltered events further include instructions to generate a decision output by a deep reinforcement learning (DRL) agent according to an event status, a vehicle status, and the reward values.

11. The non-transitory computer-readable medium of claim 9 further comprising instructions that when executed by one or more processors cause the one or more processors to filter events of the stream of events according to event importance levels and the decision policy.

12. The non-transitory computer-readable medium of claim 9 further comprising instructions that when executed by one or more processors cause the one or more processors to classify each event of the stream of events according to event importance levels and the decision policy.

13. A method for improving event management in a vehicle during automated driving, the method comprising:
   selecting unfiltered events, from a stream of events that are classified and filtered, and a display medium according to a decision policy for an operator;
   communicating the unfiltered events selected for the display medium; and
   adapting the decision policy according to collected tracking information of operator attention associated with the unfiltered events and reward values associated with the tracking information.

14. The method of claim 13, wherein selecting the unfiltered events further comprises generating a decision output using a deep reinforcement learning (DRL) agent according to an event status, a vehicle status, and the reward values.

15. The method of claim 13 further comprising filtering events of the stream of events according to event importance levels and the decision policy.

16. The method of claim 13 further comprising adapting the reward values according to eye-tracking information of the operator associated with the tracking information and a display time of the unfiltered events on the display medium.

17. The method of claim 16, wherein adapting the reward values further comprises adjusting the reward values according to the eye-tracking information indicating centered views of the unfiltered events on the display medium.

18. The method of claim 13 further comprising generating the reward values using a reward function according to one of a location, a medium type, a time duration, or an event type associated with the unfiltered events.

19. The method of claim 13 further comprising classifying each event of the stream of events according to event importance levels and the decision policy.

20. The method of claim 13 further comprising generating the stream of events for a current timeslot from a plurality of information sources associated with the vehicle and the operator.

\* \* \* \* \*